United States Patent [19]

Copeland et al.

[11] Patent Number: 5,519,226
[45] Date of Patent: May 21, 1996

[54] DETECTION OF THERMAL NEUTRONS THROUGH THE USE OF INTERNAL WAVELENGTH SHIFTING OPTICAL FIBERS

[75] Inventors: Hugh D. Copeland, Chula Vista; Jon R. Losee; Gary F. Mastny, both of San Diego, all of Calif.

[73] Assignee: The United States of America as represented by the Secretary of the Navy, Washington, D.C.

[21] Appl. No.: 371,334

[22] Filed: Jan. 11, 1995

[51] Int. Cl.[6] ........................................... G01T 3/06
[52] U.S. Cl. ........................... 250/390.11; 250/390.01
[58] Field of Search ......................... 250/390.01, 390.11, 250/370.05

[56] References Cited

U.S. PATENT DOCUMENTS

| | | |
|---|---|---|
| 4,425,907 | 1/1984 | Younghouse . |
| 4,454,422 | 6/1984 | Persyk . |
| 4,799,748 | 1/1989 | Brown . |
| 4,804,514 | 2/1989 | Bartko et al. . |
| 4,814,623 | 3/1989 | Robertson et al. . |

OTHER PUBLICATIONS

Derzon et al, [3]He Gas Scintillation Spectrometer for Fusion Neutron Measurements, Rev. Sci. Instru. 56(5) May 1985 pp. 1090–1092.

"A High-Pressure [3]HE Gas Scintillation Neutron Spectrometer", IEEE Transactions on Nuclear Science, vol. 33, No. 1–Feb. 1986.

Primary Examiner—Davis L. Willis
Assistant Examiner—Richard Hanig
Attorney, Agent, or Firm—Harvey Fendelman; Thomas Glenn Keough; Eric James Whitesell

[57] ABSTRACT

An apparatus for detection of thermal neutrons includes a volume of gas which includes [3]He. A wavelength shifting optical (WSO) fiber is disposed to receive ultra-violet (UV) photons generated by reactions between neutrons and [3]He. UV photons are absorbed within the WSO fiber to produce longer wavelength fluorescence generated photons that propagate within the WSO fiber. A photodetector is disposed to receive fluorescence generated photons from at least one end of the optical fiber and provide an output signal corresponding to neutron detection.

5 Claims, 2 Drawing Sheets

DETECTION OF THERMAL NEUTRONS THROUGH THE USE OF INTERNAL WAVELENGTH SHIFTING OPTICAL FIBERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to apparatus for detecting thermal neutrons, and more particularly, to an apparatus for detecting thermal neutrons which uses internal wavelength shifting optical fibers.

A standard method for detecting thermal neutrons is based on detection of the effects of secondary charged particles produced when a thermal neutron is captured by the helium-3 ($^3$He) nucleus. This reaction results in the production of a tritium ($^3$H) nucleus with a kinetic energy of 190 KeV and a proton (p) with a kinetic energy of 570 KeV. These energetic charged particles produce ionization tracks in surrounding substances. The ionization track will include ionized gas molecules (ions) which can be detected either by optical emissions or by direct collection of ions. Optical detection has the advantages over ion collection of more rapid response time and insensitivity to noise caused by vibration.

A neutron detector based on detection of light emission from a $^3$He gas mixture is described by Derzon, et al., in "A High-Pressure $^3$He Gas Scintillation Neutron Spectrometer," IEEE Transactions on Nuclear Science, Vol. 33, No 1, pp 247–249 (1986). The neutron detector of Derzon, et al., utilizes a pressure chamber filled With a mixture of $^3$He and Xe. The energy released by the reaction of a neutron with a $^3$He nucleus produces a pulse of ultra-violet (UV) light which is absorbed by a waveshifting fluorescent material which coats the inner surfaces of the pressure chamber. The fluorescent material then releases a pulse of visible light which is detected by a photomultiplier tube placed outside a window in the pressure chamber.

There are several disadvantages associated with the type of neutron detector described by Derzon, et al. For efficient light collection a large area window must be provided in the pressure chamber. This requires a large hermetic seal which is expensive to fabricate. Likewise, a large area optical detector such as a photomultiplier tube is needed. Large photomultiplier tubes are easily damaged. On the other hand, solid-state detectors with sufficient sensitivity, for example avalanche photodiodes, are only available with detecting areas up to about 1 cm$^2$, while photomultiplier tubes are obtainable with areas of tens of centimeters squared. In order to use a small area photodetector, efficient means for collecting and concentrating photons must be provided.

Therefore, according to this inventive concept a need has been discovered for an apparatus for detection of thermal neutrons which uses a small area photodetector.

SUMMARY OF THE INVENTION

In accordance with the present invention, the above noted problems of the prior art are overcome and there is provided an apparatus for detecting thermal neutrons using internal wavelength shifting optical fibers and a small area photodetector.

In accordance with one embodiment of this inventive concept a chamber contains a gas which includes $^3$He and Xe. A wavelength shifting optical fiber is disposed within the chamber to receive UV photons resulting from reactions between neutrons and $^3$He. The UV photons are absorbed within the wavelength shifting optical fiber to produce fluorescence generated photons that propagate within the optical fiber. A photodetector is disposed to receive fluorescence generated photons from at least one end of the optical fiber and provide an electronic signal which represents neutron detection.

BRIEF DESCRIPTION OF THE DRAWINGS

Throughout the several figures like elements are referred to with like reference characters.

DESCRIPTION OF THE PREFERRED EMBODIMENT

Figure 1:
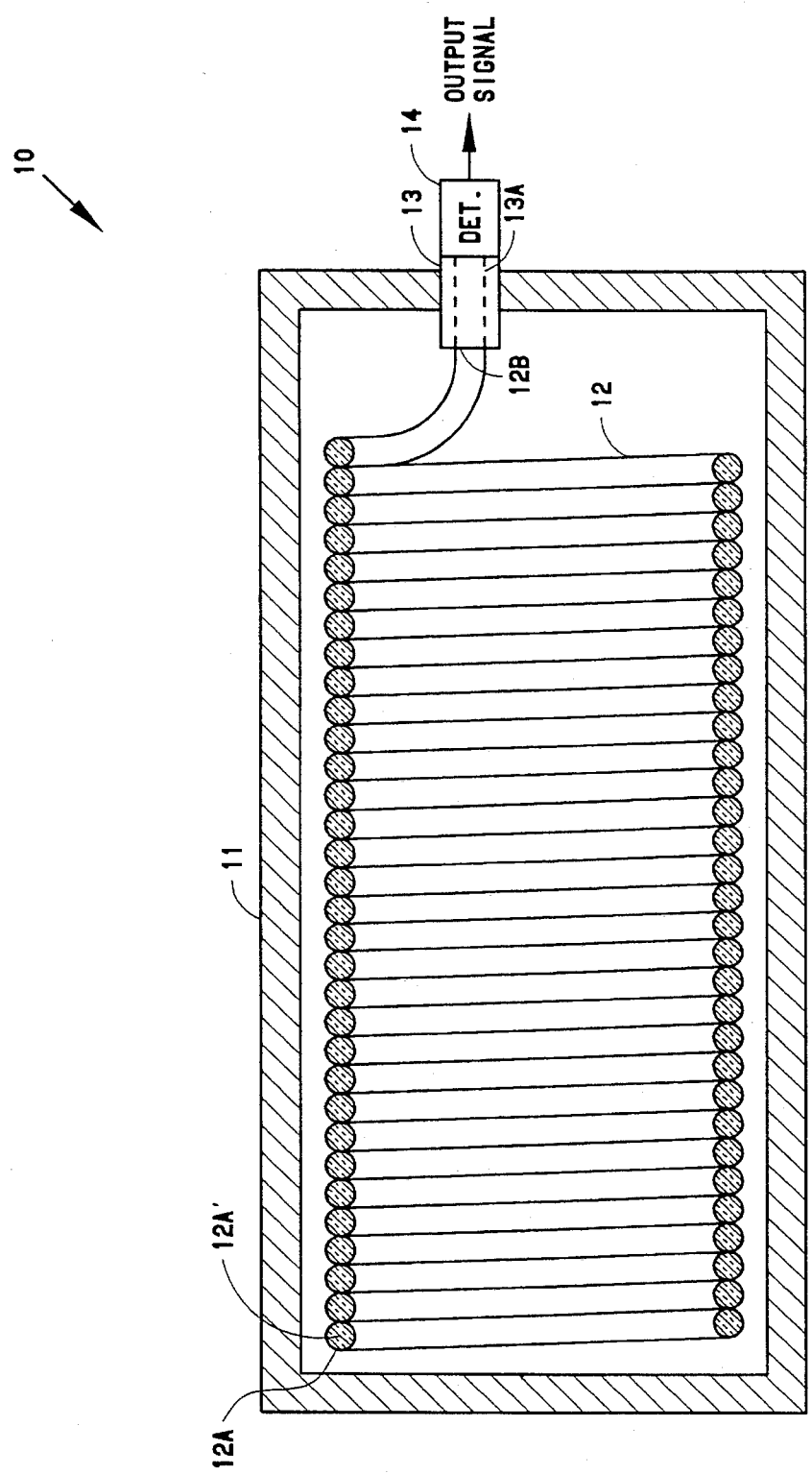
FIG. 1 is a diagram of a neutron detection apparatus in accordance with the present invention.

Referring to FIG. 1 there is shown a cross-sectional schematic diagram of a neutron detection apparatus 10 in accordance with the present invention. The cylinder axis of a cylindrically-shaped pressure chamber 11 is co-incident with the center line shown. Although a cylindrical shape is advantageous, other shapes for the pressure chamber may be employed in accordance with this inventive concept. Pressure chamber 11 may be fabricated from stainless steel or other suitable materials.

Pressure chamber 11 contains a high pressure gas mixture including $^3$He. Preferably, the gas mixture also contains Xe, or other noble gas, which is provided for the purpose of increasing the efficiency of light production by ionization tracks of energetic particles. A suitable gas mixture may be for example 90% to 95% $^3$He and 5% to 10% Xe. The gas pressure is preferably in the range of 1 to 200 atmospheres. Higher gas pressure allows a greater concentration of $^3$He in the detecting volume for improved capture of neutrons. The practical difficulty of containing very high pressure limits the $^3$He density which can be employed. Also, the gas mixture may undergo a phase transition at very high pressure.

Inside of pressure chamber 11 is a wavelength shifting optical (WSO) fiber 12. An example of a suitable WSO fiber is available from Optectron, Inc., 375 Paramount Drive, Raynham, Mass. 02767. A preferred fiber type is designated as F2011000 and is a plastic fiber with an outer diameter of 1 mm. When illuminated by ambient light in the wavelength range of 299–477 nm, fluorescent dopants in the fiber core re-emit light in the wavelength range of 471–511 nm. As will be further explained below, a portion of the re-emitted light propagates within the WSO fiber to the ends of the fiber.

WSO fiber 12 is wound into a helical coil shape which is illustrated in FIG. 1 in cross-sectional view. The axis of the helix is coincident with the center line and with the cylinder axis of pressure chamber 11. WSO fiber 12 can be bent into a helical coil by thermoforming in accordance with information provided by the manufacturer. Thermoforming is desirable to obtain a suitably small radius without cracking the fiber. A typical diameter for the helical coil may be ion the order of a few centimeters and a typical length also on the order of a few centimeters.

The helical geometry of WSO fiber 12 is advantageously chosen to provide efficient collection of UV light from ionization tracks in the gas. Other geometrical shapes and dispositions of WSO fiber 12 within chamber 11 can also be employed within the scope and practice of the inventive concept. Optionally, the inside of pressure chamber 11 is either polished or coated with a UV reflective paint to improve the efficiency of UV photon collection by WSO fiber 12.

A first end 12A of WSO fiber 12 is polished and coated with a reflecting layer 12A'. A second end 12B of WSO fiber 12 is joined to a hermetic optical feedthrough 13 which penetrates a wall of pressure chamber 11 as shown. Feedthrough 13 includes a transparent channel 13A which conveys light from end 12B of fiber 12 to a photodetector 14. Hermetic optical feedthroughs and windows are well known to engineers skilled in the field of optical technology. End 12B of fiber 12 may be joined to feedthrough 13 by transparent adhesive or other suitable bonding technique. Likewise, photodetector 14 is coupled to feedthrough 13 to efficiently receive light by adhesive or other methods well known to engineers who specialize in the application of optical devices.

A variation of the invention (not illustrated) may include placing the photodetector inside of the pressure chamber. In this case hermetic electrical feedthroughs would be provided for the photodetector electrical leads.

Another possible variation (not illustrated) would be to include a length of standard optical fiber (not WSO fiber) or a bundle of standard optical fibers between feedthrough 13 and photodetector 14. This would allow photodetector 14 to be placed at a distance from pressure chamber 11. The advantage of remote placement of the detecting volume is that photodetector 14 could be operated outside the region of radioactivity, so that direct action of radiation on photodetector 14 could be avoided.

Another variation of the invention (not illustrated) may include using a gas containing chamber fabricated from a material such as quartz which is transparent to UV light. In this variation both WSO fiber 12 and photodetector 14 would be disposed outside the gas containing chamber, and hermetic feedthrough 13 would not be required.

Photodetector 14 is advantageously a silicon avalanche photodiode such as an RCA Inc., ElectroOptics model C30921S. The use of a silicon avalanche photodiode is preferred because of high sensitivity and low noise properties. As is well known, operation of silicon avalanche photodiodes-requires suitable bias voltages and amplifiers which are not shown in FIG. 1. The use of other types of photodetector is also comprehended within the practise of the present inventive concept.

Figure 2:
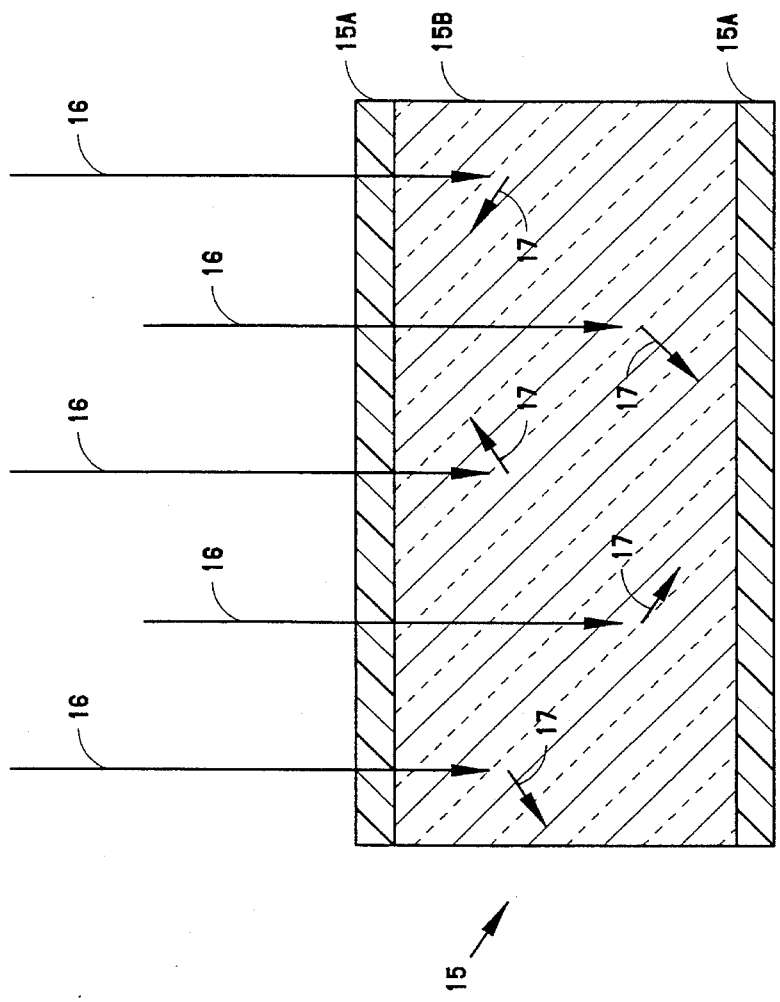
FIG. 2 is a diagram of wavelength shifting optical fiber.

FIG. 2 shows a cross-sectional view of a portion of a WSO fiber 15 which is similar to WSO fiber 12 shown in FIG. 1. UV photons 16 may propagate through a cladding 15A into a core 15B of WSO fiber 15. WSO fiber core 15B includes a dopant which is a fluorescent material. The fluorescent dopant absorbs UV photons 16 and re-emits fluorescence photons 17 of a longer wavelength. If the angle of emission of a fluorescent photon is within the acceptance angle for propagation within WSO fiber 15, the photon will propagate within the WSO fiber until it reaches an end of the fiber or is absorbed.

As referenced hereinabove, a suitable type of WSO fiber is available from Optectron, Inc. The referenced WSO fiber is composed of a polystyrene core having a fluorescent dopant and a fluoroploymer cladding. Fiber diameters from 0.25 mm to 2.0 mm in steps of 0.25 mm are available. The fibers can be bent into small radii of curvature by thermoforming. Various WSO fiber types with different types of dopant are available. One suitable WSO fiber type, F201, absorbs UV light in the wavelength range 299–477 nm and re-emits photons in the wavelength range 471–511 nm.

As noted above, some of the fluorescence generated photons are emitted at angles such that the photons become confined and propagate within the WSO fiber. When the fluorescence generated photons reach an end of the WSO fiber, they can be received by a photodetector. Since an optical fiber generally has two ends, it is possible to place photodetectors at both ends to receive the photons. Alternatively, a single photodetector can be placed at a first end and a reflective surface provided at a second end to reflect photons back through the fiber to be received at the first end by the single photodetector. Apparatus 10 shown in FIG. 1 makes use of one photodetector 14 and one fiber end 12A having a reflective surface 12A', although the use of a plurality of photodetectors is also comprehended within the practice of the inventive concept. Another alternative would be to dispose both ends of the WSO fiber so as to convey light onto a single photodetector. Another alternative would be to use a plurality of WSO fibers with the ends disposed to convey light to a single photodetector, or to a plurality of photodetectors. Obviously, many geometrical configurations and dispositions of wavelength shifting optical fibers and photodetectors can be employed within the scope of the inventive concept.

A significant advantage of the inventive concept over prior art neutron detectors such as described by Derzon, et al., op. cit., is that WSO fiber 12 receives UV photons over the relatively large surface area of the fiber cladding while the output of fluorescence generated photons is concentrated into the relatively small area at end 12B of WSO fiber 12. This provides the benefit of being able to use a small area photodetector while having a large photon collection area.

In operation, neutron detection apparatus 10 may placed at a location where it is desired to detect the presence of neutron radiation. Both thermal neutrons and energetic neutrons will interact with the gas contained in pressure chamber 11 to produce energetic charged particles. The energetic charged particles in turn produce ionization of surrounding gas molecules. The ionized gas molecules emit UV photons which are received by WSO fiber 12. Fluorescence generated photons propagate to end 12A and end 12B of WSO fiber 12. At end 12A the photons are reflected by reflective surface 12A' and propagate back to end 12B. Photons emitted from end 12B are received by photodetector 14. The output signal from photodetector 14 corresponds to detection of neutron radiation. Signals resulting from gamma radiation or other ionizing radiation may also be produced by the apparatus. However, the use of $^3$He in the primary detector volume allows the apparatus to be primarily and particularly sensitive to neutron radiation, and most particularly sensitive to thermal neutrons.

The apparatus detects thermal neutrons and employs a fluorescent optical fiber for collecting and wavelength shifting UV photons, and a robust, small area photodetector.

Many modifications and variations of the present invention are possible in light of the above teachings. It is therefore to be understood that within the scope of the appended claims, the invention may be practised otherwise than as specifically described.

What is claimed is:

1. A neutron detector comprising:

an enclosure;

a volume of gas disposed within said enclosure for reacting with neutrons passing through said enclosure to generate photons having a first wavelength;

a wavelength shifting optical fiber disposed within said enclosure and operably coupled to said volume of gas for reacting with said photons having said first wavelength to generate photons having a second wavelength; and a photodetector operably coupled to said optical fiber for receiving said photons having said second wavelength and for generating a representative output signal, wherein said output signal is operably coupled to said photodetector through said enclosure for connection outside said enclosure.

2. The neutron detector of claim 1 wherein said gas comprises at least one of $^3$He and Xe.

3. The neutron detector of claim 1 wherein said optical fiber comprises a fluorescent dopant.

4. The neutron detector of claim 1 wherein said optical fiber has a reflecting surface at one end and is operably coupled to said photodetector at another end.

5. The neutron detector of claim 1 wherein said photodetector comprises a silicon avalanche photodetector.

* * * * *